Figure 1:
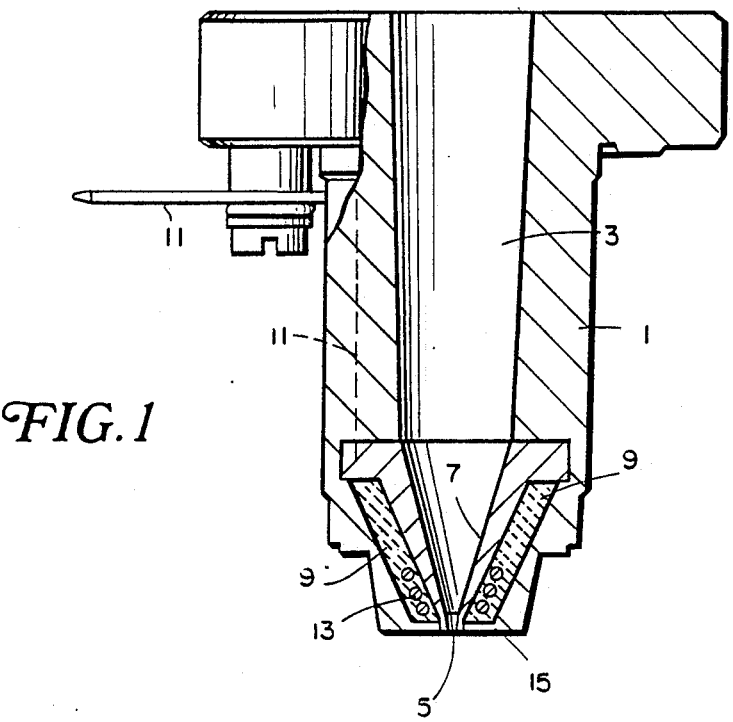

United States Patent [19]

Zimmerman

[11] Patent Number: 4,954,072
[45] Date of Patent: Sep. 4, 1990

[54] ELECTRICALLY HEATED PIN-POINT GATE

[76] Inventor: Wolfgang Zimmerman, Tulpenstrasse 15, D-8201 Schechen, Fed. Rep. of Germany

[21] Appl. No.: 332,279
[22] PCT Filed: Sep. 17, 1987
[86] PCT No.: PCT/EP87/00532
  § 371 Date: Mar. 10, 1989
  § 102(e) Date: Mar. 10, 1989
[87] PCT Pub. No.: WO88/01928
  PCT Pub. Date: Mar. 24, 1988

[30] Foreign Application Priority Data

Sep. 19, 1986 [DE] Fed. Rep. of Germany ....... 3631850

[51] Int. Cl.$^5$ .............................................. B29C 45/20
[52] U.S. Cl. ................................ 425/549; 264/328.15; 425/568; 425/570
[58] Field of Search ............... 425/144, 549, 568, 570; 264/328.15

[56] References Cited

U.S. PATENT DOCUMENTS 3,970,821 7/1976 Crandell .......................... 425/144

FOREIGN PATENT DOCUMENTS 2011653 9/1971 Fed. Rep. of Germany.
2225954 11/1973 Fed. Rep. of Germany.
8524458.9 4/1986 Fed. Rep. of Germany.
8535572.0 6/1986 Fed. Rep. of Germany.
8618067.3 7/1987 Fed. Rep. of Germany.
48-5093 2/1973 Japan.
59-220337 12/1984 Japan.
59-220338 12/1984 Japan.
59-220339 12/1984 Japan.

OTHER PUBLICATIONS

Mold-Masters Pamphlet, Jun. 1988.
Patent Abstracts of Japan, vol. 8, No. 9 (M-268) (1446), Jan. 14, 1984, No. 58-171932 (Jiyuuou Shoji), Oct. 8, 1983.
"Wirtschalftliches Spritzgiessen mit kaltem Heisskanalsystem", Gunther, Kunststoofe-Plastics, Dec. 1981.
"Systeme des Angusslosen Spritzgiessens—Entscheidungschilfen zur Auswahl des geeigneten Systems" Hartmann, PLASTverarbeiter 33, Jahrgang 1982, No. 5.
"Systeme des Angusslosen Spritzgiessens—Entscheidungschilfen zur Auswahl des geeigneten Systems" Hartmann, PlASTverarbeiter 33, Jahrgang 1982, No. 4.

Primary Examiner—Jay H. Woo
Assistant Examiner—Timothy W. Heitbrink
Attorney, Agent, or Firm—Nixon & Vanderhye

[57] ABSTRACT

To provide a thermodynamic pinpoint gate nozzle which will permit a so-called cosmetic gate without stringing, and during which the plastic material to be processed is not subjected to high viscous or shear stress by the heating elements placed inside the nozzle channel, it is provided that the pinpoint gate nozzle on the side facing the mold cavity exhibits a low-mass inside nozzle (7) and that inside nozzle (7) can be heated by an ohmic resistance wire either inductively or by inside nozzle (7) formed as a Peltier element.

13 Claims, 2 Drawing Sheets

ELECTRICALLY HEATED PIN-POINT GATE

The invention relates to an electrically heated pinpoint gate nozzle.

A pinpoint gate for injection molds to produce plastic articles has the advantage that no further processing is required, there is no waste and energy is saved.

Since in principle the problem and the drawback is that the melt freezes too soon in the narrow, cool nozzle channel, and thus only incomplete dwell pressure can be exerted as a result of which the injection-molded parts can exhibit bad dimensional stability, it is known in principle to equip the pinpoint gate system with heating of the gate channel. For this purpose, the gate channel is generally permanently heated, and as the only variable, the temperature is adjusted as precisely as possible.

In the known heating system, for example according to DE-GM 85 35 572, the channel wall of the nozzle channel is heated by a heating coil surrounding it. In other systems, a heated torpedo jutting with the tip into the gate opening is used as mentioned, e.g., in the journal "PLASTverarbeiter, Vol. 33, 1982, pages 387 to 392." Because of the type of heating, for reasons of stability, the heating with the conventional torpedo constructions cannot be brought into the immediate vicinity of the thermally critical gate area. For this reason, the torpedo tips are often shaped over an extended length like pointed cones. The continuously decreasing, heat-conducting cross section necessarily leads to a larger temperature difference within the nozzle. The consequence is an increased risk of thermal damage to the melt flowing along the torpedo.

Heating a torpedo tip mounted in the nozzle channel by a separate control circuit has already been suggested and tried.

However, such a system is extremely wasteful and expensive and has not proved itself in practice.

Basically, a Japanese system in which the torpedo tip jutting into the gate opening is cyclically heated has also become known.

In the prior art initially cited, the heating of the hot well and of the pinpoint gate channel has the disadvantage that even when the injection molded part is demolded, the thermoplastic melt in the pinpoint gate still becomes hot and, therefore, plastic. This disrupts the demolding process, particularly with small parts.

In contrast to this, the prior art described in the second instance using heatable torpedoes can produce a so-called cosmetic gate since the outside of the sprue has cooled sufficiently during demolding and therefore breaks off cleanly. Nevertheless, this prior art has several other decisive disadvantages compared to the hot well heating. Thus, the fact that the heated tip juts into the gate opening even further increases the shear rate and thus the shear stress, which often reaches excessive values even in the case of the open nozzle. This can lead to mechanical damage of the material. A thicker melt boundary layer than that on the hot channel wall forms on the cold side of the nozzle chamber, thus further narrowing the free opening cross section, which should anyhow be as small as possible for a cosmetic gate. This also leads to a greater undesirable increase in the shear stress. In addition, the exact fitting-in of the torpedo tip into the nozzle opening requires a large technical expenditure, which is also reflected in the high cost of the system. Finally, if color or material are changed, a large number of the reject moldings occur because the complicated melt path only permits the new material to slowly displace the old.

It is the purpose of this invention to overcome the drawbacks according to the prior art and to produce a thermodynamic pinpoint gate nozzle with which a cosmetic gate can be achieved, using the largest possible flow opening to avoid viscous and shear stress.

In the pinpoint gate nozzle according to the invention, a low-mass inside nozzle is provided in the nozzle point which is heated there without the torpedo heating placed inside the nozzle channel. Thus, the inside nozzle can be extremely rapidly heated and just as rapidly cooled and the nozzle channel is kept hot only during the injection and dwell phase, so that a desired sealing time can be set. During the cooling phase, the nozzle point is cooled by the cold tool (by means of the lug), thus allowing a smooth break during demolding. Using the cyclic heating, thus clearly reproducible conditions can be achieved. With the thermodynamic pinpoint gate nozzle, the following advantages can be realized:

A cosmetic gate with a smooth break without any pin drawing or stringing is possible at all times.

The pinpoint gate nozzle has the largest possible free flow opening. By heating the channel walls during injection of thermoplastics, only a thin boundary layer forms.

The nozzle channel is protected by a wear-resistant and anti-adhesive coating of, e.g., titanium nitride or similar substances. As a result many plastic melts slide along the channel wall during injection. The sliding entails slight shear forces and shear stress, thus protecting the material.

No parts whatsoever to be inserted are planned that could increase the shear stress or jut into the nozzle opening.

The nozzle has no moving parts which could jam, are subjected to wear or need to be set with highest precision.

The hot channel walls only briefly come into contact with moving thermoplastic melt. As soon as the melt-flow stops, the heating is turned off. Therefore, this does away with the need for a costly temperature monitoring system and the nozzle is particularly suitable for thermally sensitive plastics.

There are no undercuts or dead corners in the melt path.

A change of material or color can easily be accomplished without waste by the removal of the cold slug from the hot well.

By dimensioning the nozzle opening, the throughflow for multicavity molds can be regulated.

The nozzle heating system uses relatively little current.

The construction of the nozzle is simple and it can be quickly installed or removed.

The nozzle is relatively small and compact. Its installation causes only minor weakening of the mold plate.

In this connection, the heating system can be operated either by a resistance wire inductively or by a Peltier element.

Figure 2:
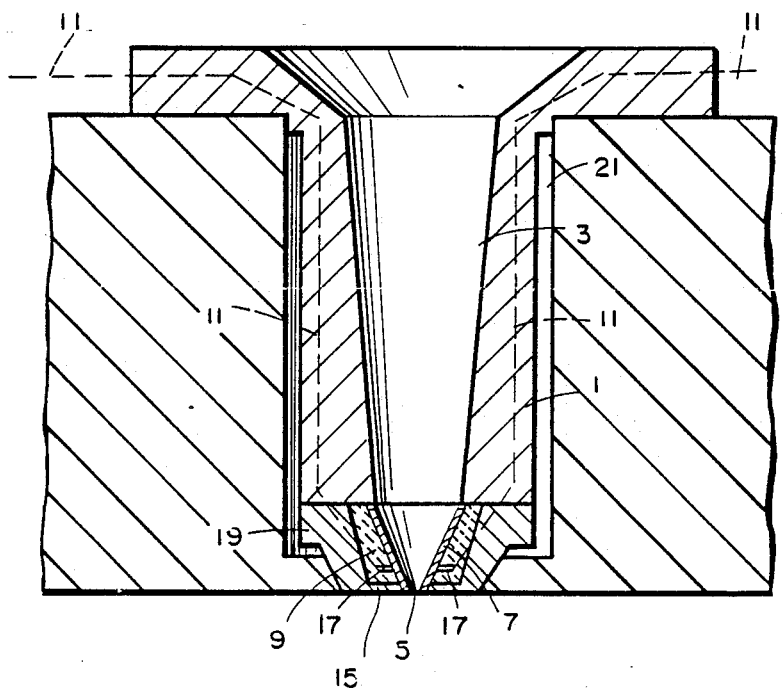
Figure 3:
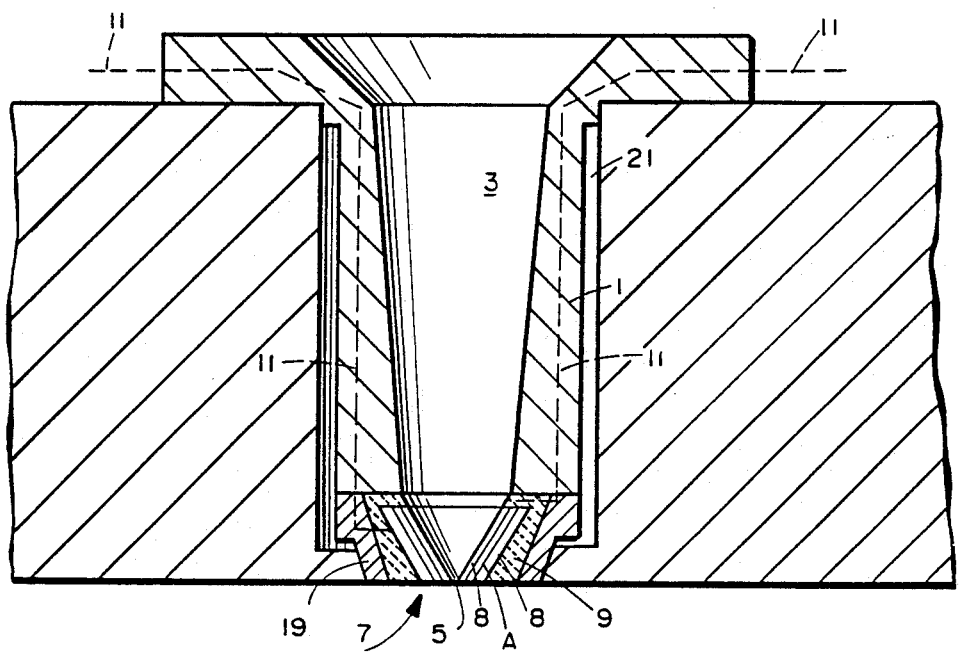

Further advantages, details and features of the invention follow below from embodiments of the drawings represented. Here are shown in detail:

FIG. 1: a diagrammatic longitudinal section through a pinpoint gate nozzle according to the invention, heated by a coil or a resistance wire;

FIG. 2: a modification of FIG. 1 in which the heating of the inside nozzle takes place by two contact pins;

FIG. 3: another diagrammatic cross section representation of a pinpoint gate nozzle according to the invention, in which the inside nozzle is heated by a Peltier element.

FIG. 1 shows a pinpoint gate nozzle with a hot well 3 in nozzle body 1. An inside nozzle 7, narrowing toward gate opening 5, is provided at the side of nozzle body 1 facing a bottom mold cavity in a mold, not shown in detail in FIG. 1. The inside nozzle consists of a material with good thermally and electrically conductive properties of a high resistance to wear and a low mass of, for example, less than 5, 4, 3 or 2 grams, and preferably less than 1 gram. The outside of inside nozzle 7 is surrounded or coated by a material which is both thermally insulating and a poor conductor of electricity. A ceramic, for example zirconium oxide, is suitable for this purpose. Naturally, other materials or other ceramic materials are suitable as thermal insulation 9.

Further, one of two connecting wires 11 is shown in FIG. 1. The further course of connecting wire 11 for the power supply for heating is shown only diagrammatically as a broken line in FIG. 1 and leads to a spiral or coil 13 embedded in the thermal insulation material, preferably in ceramic 9. Spiral or coil 13 can act as a thermal coil, that is, as a resistance wire, to provide heat. But just as possible is inductive heating by an alternating current field of suitable frequency which heats inside nozzle 7.

When the inside nozzle 7 is rapidly heated, the heating process and the course of the temperature are influenced by the thickness of lug 15, i.e. of metal lug (15), at the front end of the nozzle, which thermally connects the nozzle point with the mold, not shown in FIG. 1, or by the thermal insulation layer, i.e. the ceramic layer, which insulates usual nozzle body 1 of the mold. In this way the heat loss during the cooling period can be preset and established. Three magnitudes can thus be varied in the case of thermodynamic pinpoint gate(s). They are: thermal output (temperature), length of the heating period and heat loss.

The following refers to FIG. 2, in which inside nozzle 7 is heated by two contact pins 17 to produce an ohmic resistance. Deviating from the embodiment of FIG. 1, heating here is achieved by a defined ohmic resistance rather than by a thermal coil or inductive heating. Inside nozzle 7 itself is not suitable for this because its cross section is too large. The two contact pins 17 mentioned are therefore used as resistors, and are mounted near the narrowest inside cross section of the nozzle with their diameter (approx. 1 mm) being exactly maintained, and connected to the electrical heating circuit by the two connecting wires 11. Since the other cross sections of the heating circuit are much larger, less than 15 volts will produce heat in these contact pins which will immediately be conducted to nozzle body 1 because of the good thermal conductivity.

The heating circuit is automatically switched on or off by the injection molding machine during opening or closing of the mold. The length of the heating period can then be adjusted in an infinitely variable manner, e.g. by a time switch. Further, the strength of the current, which determines the temperature, is regulated. When the system switches on, the strength of the current is increased by suitable means, so that the temperature rapidly increases at the beginning, thus creating a larger electrical resistance. But other means can, of course, also produce an initially stronger, then gradually decreasing thermal output. After heating, the heat loss during the cooling phase is so large that the melt temperature in the nozzle channel reaches the brittleness range during demolding.

This means that inside nozzle 7 is not ideally thermally insulated and that the heat loss can be influenced by the type of thermal insulation. This heat loss is overcompensated for by a correspondingly large thermal output during the heating phase. Since the thermal value of inside nozzle 7 is regulated in this manner, the required thermal output (a maximum of 200 watts) can easily be possible, which can be achieved by the above-noted defined ohmic resistance with appropriate use of contact pins.

Further in FIG. 2 in addition a sealing ring can be provided on a shoulder in the area toward the mold. The nozzle body itself can be provided on the outside with continuous recess rings to achieve an air gap 21. Also in the embodiment explained here, above mentioned contact pins 17 are embedded in the thermal insulation body, preferably in the ceramic body, and are in contact with the inside nozzle with formation of a common heating circuit.

Finally reference is made to FIG. 3, in which heating by means of the Peltier effect is shown. For this purpose, the inside nozzle must be thermally separated as well as possible from the rest of the cooled mold, which is why the inside nozzle can be surrounded by a front and rear sealing ring in the direction of flow. It is further sheathed with a ceramic insulation as thermal insulation 9 and preferably made of zirconium oxide, with low thermal conductivity. The mounting can also be better thermally separated than with ohmic heating. The nozzle itself is formed as Peltier element and consists of three conical inside nozzle bodies sitting inside one another with a central conductor A to which inside and outside a conical conductor 8 each has been soldered. Thermal insulation 9 is surrounded by steel ring 19.

Depending on the polarity of the direct current, the innermost inside nozzle body will either be heated or cooled by the passage of the current. Thus, since in the case of inductive or ohmic heating, a directly controllable cooling effect is possible, the size and dimensioning of lug 15 mentioned in the other systems and thermal insulation 9 have only little importance for regulating the heat loss during the cooling phase. As shown in FIG. 3, lug 15 can even be omitted in this embodiment.

The invention concerns a pinpoint gate nozzle exhibiting a heretofore unknown additional inside nozzle 7 which is separately heated. Here heating takes place especially by inductive heating or by heating by means of a Peltier element in the inside nozzle, that is, in the wall of the inside nozzle itself. When ohmic resistance heating is used, the heat is supplied by resistance coils or wires surrounding the outside circumference of the inside nozzle, for example in the form of the above mentioned contact pins. With suitable construction corresponding ohmic resistance elements could optionally also be provided in the wall of the inside nozzle.

When the injection nozzle is used in multicavity molds, the hot well is omitted. In multicavity molds with several, also differing mold volumes, the filling rate can be regulated by variation of the nozzle dimensions or the nozzle opening. Thus, e.g. simultaneous filling of several mold cavities of different size can be achieved by providing the smaller mold cavity with a pinpoint gate nozzle of smaller dimensions, and providing the larger mold cavity with a correspondingly larger nozzle. The heated runner system can then have an equal channel cross section throughout. When thermoplastics are to be processed, the nozzle is heated during the injection phase. When elastomers or duromers are to be processed, the nozzle is not heated during the injection phase, but rather, it is heated during the following crosslinking reaction.

I claim:

1. An electrically heatable pinpoint gate nozzle for an injection molding machine said gate nozzle comprising:
   means defining an axially extending central flow channel having a gate opening for allowing flow of plastic material into a mold cavity of a molding machine;
   a conical inside nozzle in said flow channel formed of a thermally conductive wear-resistant material and located adjacent said gate opening on an upstream side thereof;
   said inside nozzle surrounding said gate opening and having a central flow path in communication with said flow channel and said gate opening;
   means carried by said gate nozzle for heating the inside nozzle; and
   a lug carried by the nozzle and formed of thermally conductive material, said lug being disposed perpendicular to a longitudinal axis of said flow channel and in thermal contact with said inside nozzle, whereby heat transfer during a cooling period is dependent upon the thickness of the lug.

2. A nozzle according to claim 1 wherein the mass of the inside nozzle is on the order of 5 g or less.

3. A nozzle according to claim 1 wherein said flow channel defining means includes a nozzle body, and means for thermally insulating said inside nozzle from said nozzle body.

4. A nozzle according to claim 3 wherein said thermal insulating means comprises a non-electrically conductive material.

5. A nozzle according to claim 4 wherein said non-electrically conductive material is a ceramic.

6. A nozzle according to claim 1 wherein said heating means includes a resistance wire disposed about said inside 7. A nozzle according to claim 6 wherein said heating means includes two or more contact pins attached to said inside nozzle outside said nozzle flow channel for heating said inside nozzle by ohmic resistance heating.

8. A nozzle according to claim 1 wherein said heating means includes a coil winding surrounding said inside nozzle for inductively heating said inside nozzle.

9. A nozzle according to claim 3 wherein said heating means is embedded in said thermally insulating means surrounding said inside nozzle.

10. A nozzle according to claim 1 wherein said heating means is located to provide heat to the plastic material flowing through said gate opening.

11. An electrically heatable pinpoint gate nozzle for injecting plastic material into a cavity of a molding machine, said gate nozzle comprising means defining a nozzle body having a central flow channel for the plastic material, a low mass inside nozzle located inside said central flow channel and facing the mold cavity, said inside nozzle including a Peltier element for heating said inside nozzle and means for supplying electrical energy to said Peltier element.

12. A nozzle according to claim 11 including means for supplying a direct electrical current to said Peltier element whereby said inside nozzle can be either heated or cooled, depending on the polarity of the direct current, and means for thermally insulating said inside nozzle relative to the nozzle body.

13. A nozzle according to claim 11 wherein the mass of the inside nozzle is on the order of 5 g or less.

* * * * *